United States Patent [19]

Schneebeli et al.

[11] 4,288,703
[45] Sep. 8, 1981

[54] LARGE DIAMETER HYDROELECTRIC MACHINE

[75] Inventors: Friedrich Schneebeli, Oberengstringen, Switzerland; Mario Biondetti, Schio, Italy

[73] Assignee: Escher Wyss Limited, Zurich, Switzerland

[21] Appl. No.: 123,465

[22] Filed: Feb. 21, 1980

[30] Foreign Application Priority Data

Feb. 26, 1979 [CH] Switzerland ............... 1857/79
Jul. 16, 1979 [DE] Fed. Rep. of Germany ....... 2933062

[51] Int. Cl.³ .................. F01D 15/10; F03B 3/14; F03B 13/00
[52] U.S. Cl. .................. 290/52; 415/129; 415/141; 290/54
[58] Field of Search .............. 290/52, 54; 308/72; 415/122 A, 129-133, 140, 141

[56] References Cited

U.S. PATENT DOCUMENTS 3,785,747  1/1974  Mayo, Jr. ................ 290/52
4,064,403 12/1977  Miller ................... 290/52
4,123,666 10/1978  Miller ................... 290/52
4,129,786 12/1978  Miller ................... 290/52

FOREIGN PATENT DOCUMENTS 856575  6/1940  France ................ 415/130

Primary Examiner—J. V. Truhe
Assistant Examiner—Shelley Wade
Attorney, Agent, or Firm—Robert A. Ostmann

[57] ABSTRACT

An hydroelectric machine is disclosed wherein the rotor of an electric machine is arranged around the rotor of a hydraulic machine, the internal rotor comprising the turbine blades which engage the external rotor to transmit torque therebetween. Each of the internal and external rotors is mounted in a separate radial bearing and the turbine blades of the internal rotor are connected to the external rotor by means of an articulated coupling which permits relative radial movement therebetween. It is preferred to include force compensating means for transmitting circumferential forces between the rotors. Suitable such means comprise an hydraulic servo-motor associated with each blade of which the pressure chambers are interconnected by means of a ring conduit.

6 Claims, 3 Drawing Figures ial rotor of an electric machine is arranged around the rotor of an hydraulic machine, the internal rotor comprising the turbine blades of the hydraulic machine and the external rotor comprising the rotary part of the electrical machine and which is engaged by the ends of the turbine blades.

In known hydroelectric machines of this kind, which are known as tube turbines, either the external rotor, or the inner rotor, i.e. the hub of the hydraulic machine, is radially mounted relative to the base, but not both. Thus, one of the two rotors is supported relative to the base solely by means of the turbine blades which connect the two rotors. This can impose undesirable strains on either or both of the blades and the connection to the external rotor.

SUMMARY OF THE INVENTION

The present invention aims to provide an hydraulic machine in which both rotors are satisfactorily mounted and in which undesirable stresses in the blades and connection are minimized, even in large diameter machines.

To this end, in an hydroelectric machine of the kind referred to above each rotor is mounted in a separate radial bearing and the turbine blades are connected to the external rotor by means of an articulated coupling permitting relative radial movement therebetween.

It is preferred that the machine also includes force compensating means for transmitting circumferential forces between the turbine blades and the external rotor. One suitable form of the force compensating means comprises a hydraulic servo-motor for the end of each turbine blade and a ring conduit which connects the pressure chambers of the servo-motors to each other. The servo-motors may be double acting, the pressure chambers at one end of the servo-motors and the pressure chambers at the other end of the servo-motors being interconnected by means of separate ring conduits. To compensate for any losses of pressure medium in the servo motor circuits it is advantageous to include control means which senses the position of the piston of one of the servo-motors and supplies pressure medium to the ring conduit when the piston moves beyond a prescribed range of play towards the pressure chamber and/or takes pressure medium from the ring conduit if the piston moves away from the pressure chamber beyond the prescribed range of play. Such means may be employed both with single and with double acting servo-motors.

A purely mechanically acting force compensating means may be used. A suitable such means comprises, for the end of each turbine blade, a bell crank lever mounted in the external rotor, one arm of which is hingedly connected to the end of the turbine blade and the other arm of which is hingedly connected to a linkage common to all the bell crank levers. This linkage preferably includes rods extending through an axial bore in each turbine blade, the rods being hingedly connected to a central member arranged in the centre of the internal rotor.

DESCRIPTION OF PREFERRED EMBODIMENTS

The invention will now be described by way of example and with reference to the accompanying drawings which show, schematically two exemplary embodiments of the invention.

Figure 1:
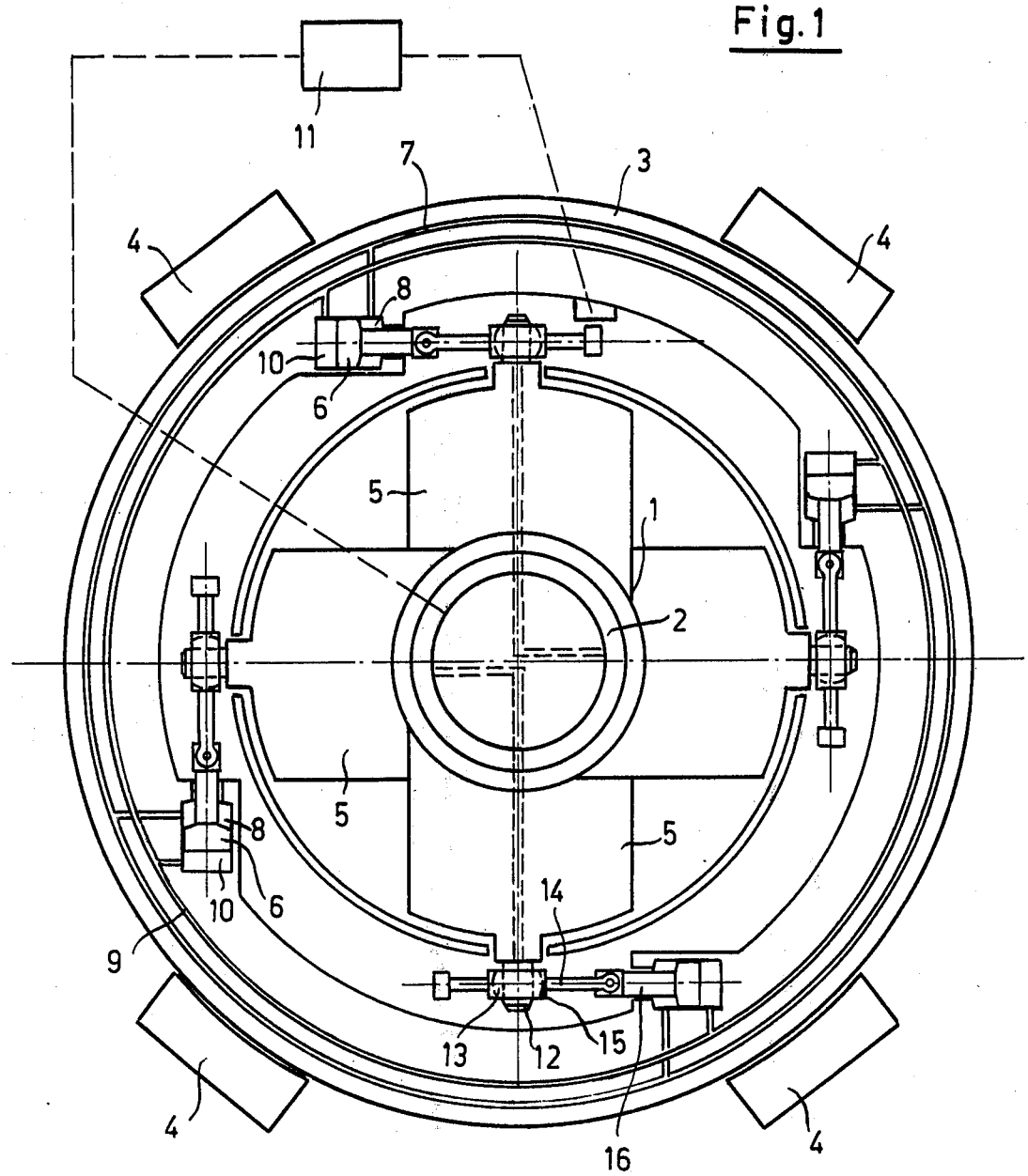
FIG. 1 shows a cross section through the internal and external rotors of a tube turbine according to a first embodiment.

In the embodiment of FIG. 1 an internal rotor 1 is radially mounted relative to the base in a radial bearing 2, and an external rotor 3 is radially mounted relative to the base in a radial bearing having bearing shoes 4. The outer ends of turbine blades 5 engage in the external rotor 3 in articulated manner and so as to be radially movable relative to the rotor. A force compensating means is provided for transmitting the circumferential forces from the turbine blades 5 to the external rotor 3.

This force compensating means comprises a hydraulic servo-motor for each tubine blade 5. A ring conduit 7 connects the pressure chambers 8 of the servo-motors 6 to one another.

The hydraulic servo-motors 6 are double acting. Just as the pressure chambers 8 at one end are connected to one another by a ring conduit 7, a ring conduit 9 connects the pressure chambers 10 at the other end of the servomotors.

A control device 11 is also provided, which senses the position of the piston of one of the servo-motors 6 and supplies pressure medium to the ring conduit 7 or 9 if the piston moves out of a prescribed play range towards the pressure chamber 8 or 10, and/or takes pressure medium from the ring conduit 7 or 9 if the piston of the servo-motor moves away from the pressure chamber 8 or 10 beyond the prescribed play range.

The outer end of each turbine blade 5 has peg 12 to which a ring 13 with a spherical outer surface is fixed. A linkage 14 rests on the spherical ring 13 via a ball socket 15. The linkage 14 extends in the circumferential direction of the rotor 3 and is hingedly connected to a piston rod 16 of the piston of the servo-motor 6.

The connection of the internal rotor 1 to the external rotor 3 transmits only circumferential forces, but allows other movements between the rotor 1 and the rotor 3. As a result, the two radial bearings 2 and 4 of the hydroelectric machine remain free from compulsive forces if the radial bearings have an eccentricity or are made eccentric by the operating forces; angular deviations of the axes of the two radial bearings 2 and 4 are also possible without any compulsive forces. Moreover, axial displacements are possible between the internal rotor 1 and the external rotor 3. It is also possible for the annular external rotor 3 to expand or contract under the influence of centrifugal forces or temperature fluctuations without any compulsive forces between the two rotors 1 and 3.

Figure 2:
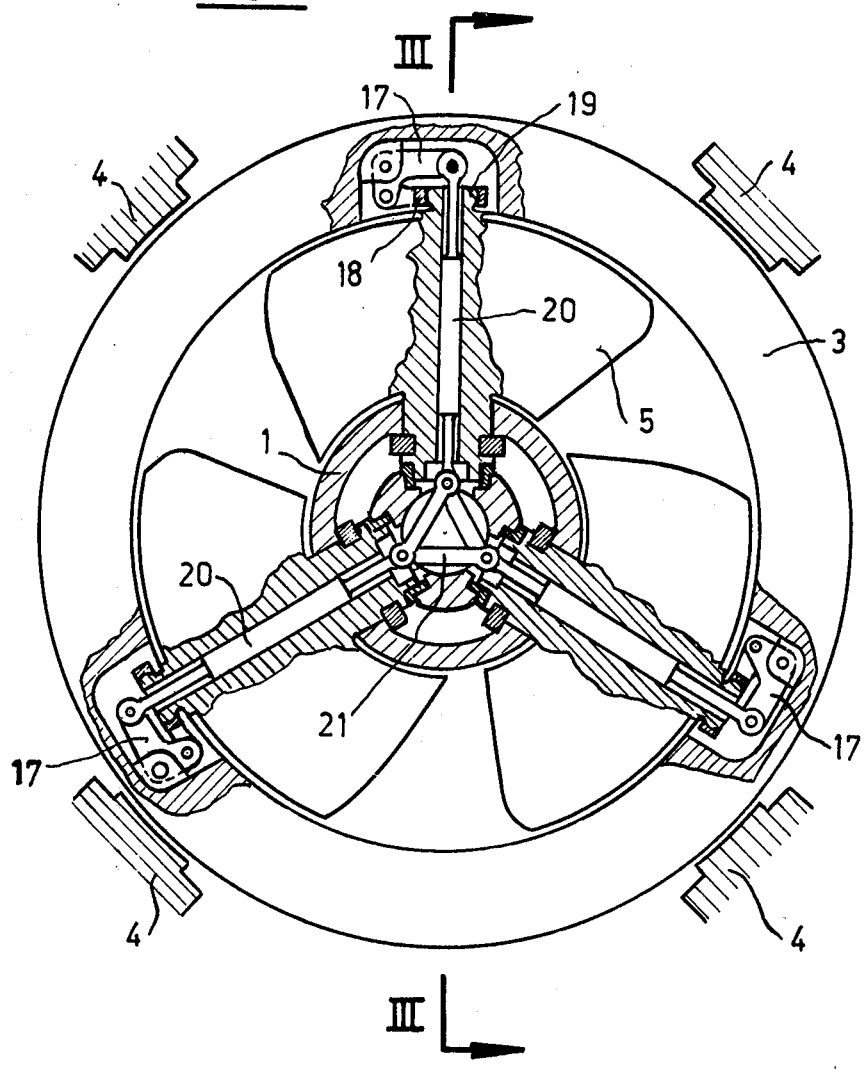
FIG. 2 shows a cross section through the internal and external rotors of a tube turbine according to a second embodiment.
Figure 3:
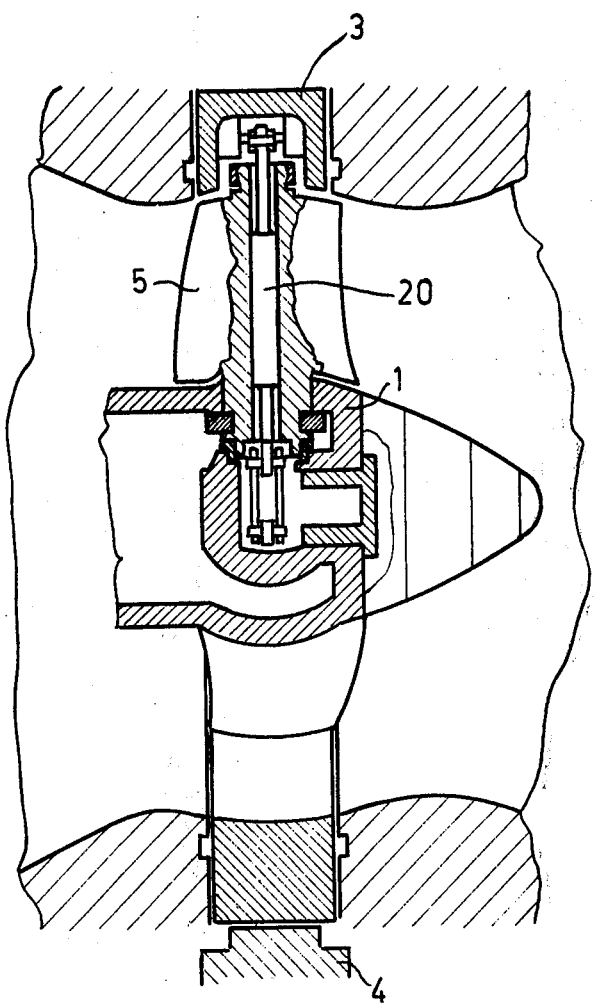
FIG. 3 shows a section on the line III—III in FIG. 2.

In the embodiment shown in FIGS. 2 and 3, the force compensating means operates entirely with mechanical elements. For the end of each turbine blade, a bell crank lever 17 mounted in the external rotor 3 is provided, one arm of which lever is connected via a rod 18 to a spherical end 19 of the turbine blade 5, whilst the connections between the rod 18 and the bell crank lever 17 and between the rod 18 and the turbine blade 5 are articulated. The other arm of the bell crank lever 17 is connected to a linkage common to all the bell crank levers.

This linkage comprises, for each bell crank lever, a rod 20 which passes through an axial bore in the associated turbine blade 5. The rods 20 are hingedly connected to a central member 21 arranged in the centre of the internal rotor 1. In the exemplary embodiment, this central member consists of three flaps but could also be in one piece.

The rods 20 must have some play, at both ends, relative to the axial bore in the blades 5, or must be elastically flexible at their ends, so as not to jam when the bell crank lever 17 is pivoted and when the central member 21 migrates out of the central position lying on the axis of the hydraulic machine. Advantageously, the bell crank levers 17 are arranged so that the rods 20 act as pull rods.

We claim:

1. An hydroelectric machine having an internal rotor comprising the turbine blades of an hydraulic machine and an external rotor comprising the rotor of an electric machine; a separate radial bearing for each of said rotors; an articulated coupling connecting the end of each turbine blade to the external rotor, said coupling permitting relative radial movement therebetween; and force compensating means connecting the end of each turbine blade to the external rotor, said compensating means permitting circumferential movement between the turbine blades and the external rotor while transmitting circumferential forces therebetween.

2. An hydroelectric machine according to claim 1 wherein the force compensating means comprises an hydraulic servo-motor associated with each turbine blade, and a ring conduit interconnecting the pressure chambers of the servo-motors.

3. An hydroelectric machine according to claim 2 wherein the servo-motors are double acting, a pair of ring conduits interconnecting the respective pressure chambers thereof.

4. An hydroelectric machine according to claim 2 including a control device which monitors the action of the servo-motors and controls the amount of pressure medium in the ring conduit accordingly.

5. An hydroelectric machine according to claim 1 wherein each turbine blade is connected to the external rotor by means of a bell crank mounted on the external rotor, one arm of which is hingedly coupled to the end of the turbine blade, and the other of which is hingedly coupled to a linkage common to all the ball cranks.

6. An hydroelectric machine according to claim 5 wherein said linkage comprises a plurality of rods, each extending through a bore formed in a turbine blade from said hinged coupling to a unit mounted centrally of the internal rotor.

* * * * *